UNITED STATES PATENT OFFICE.

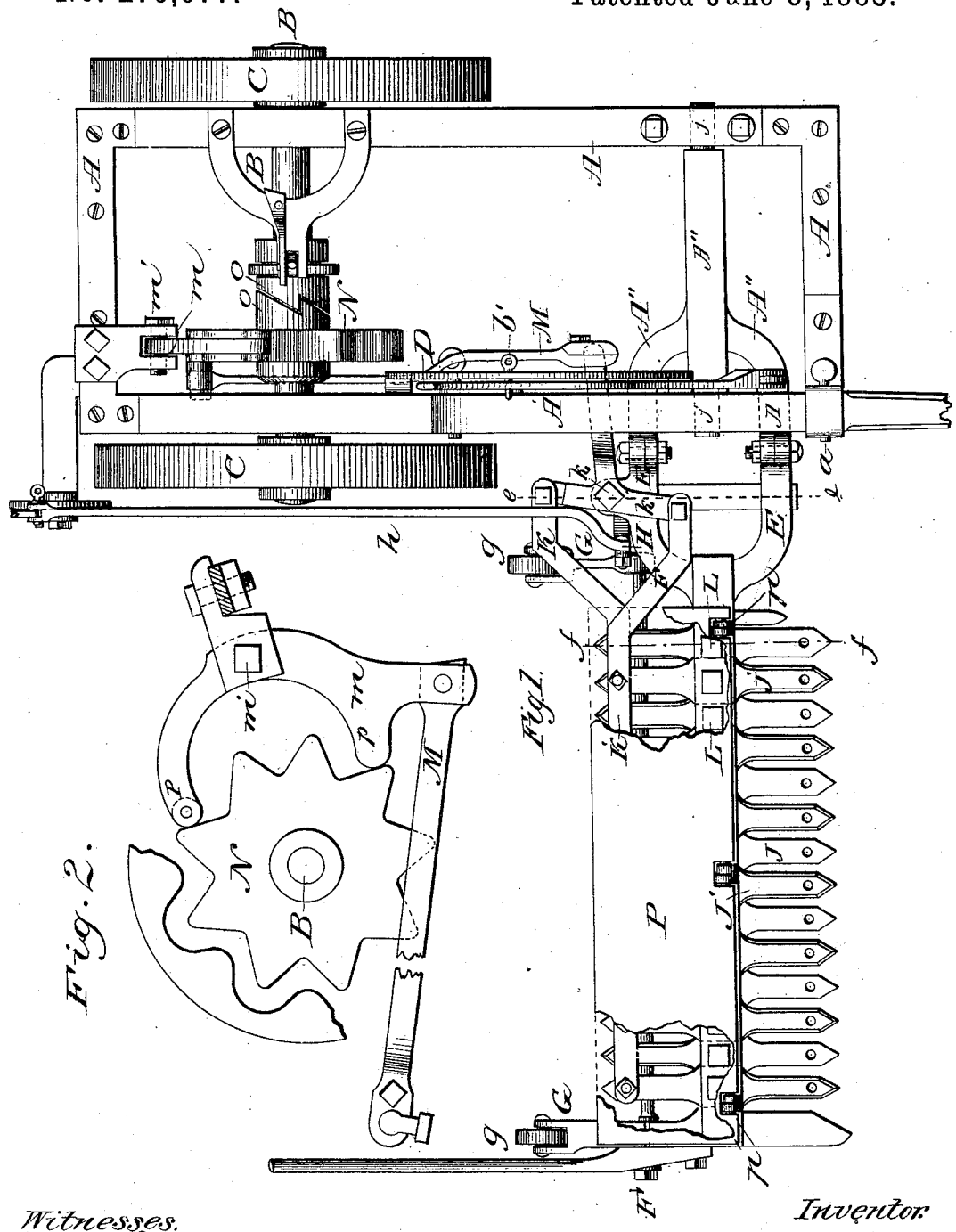

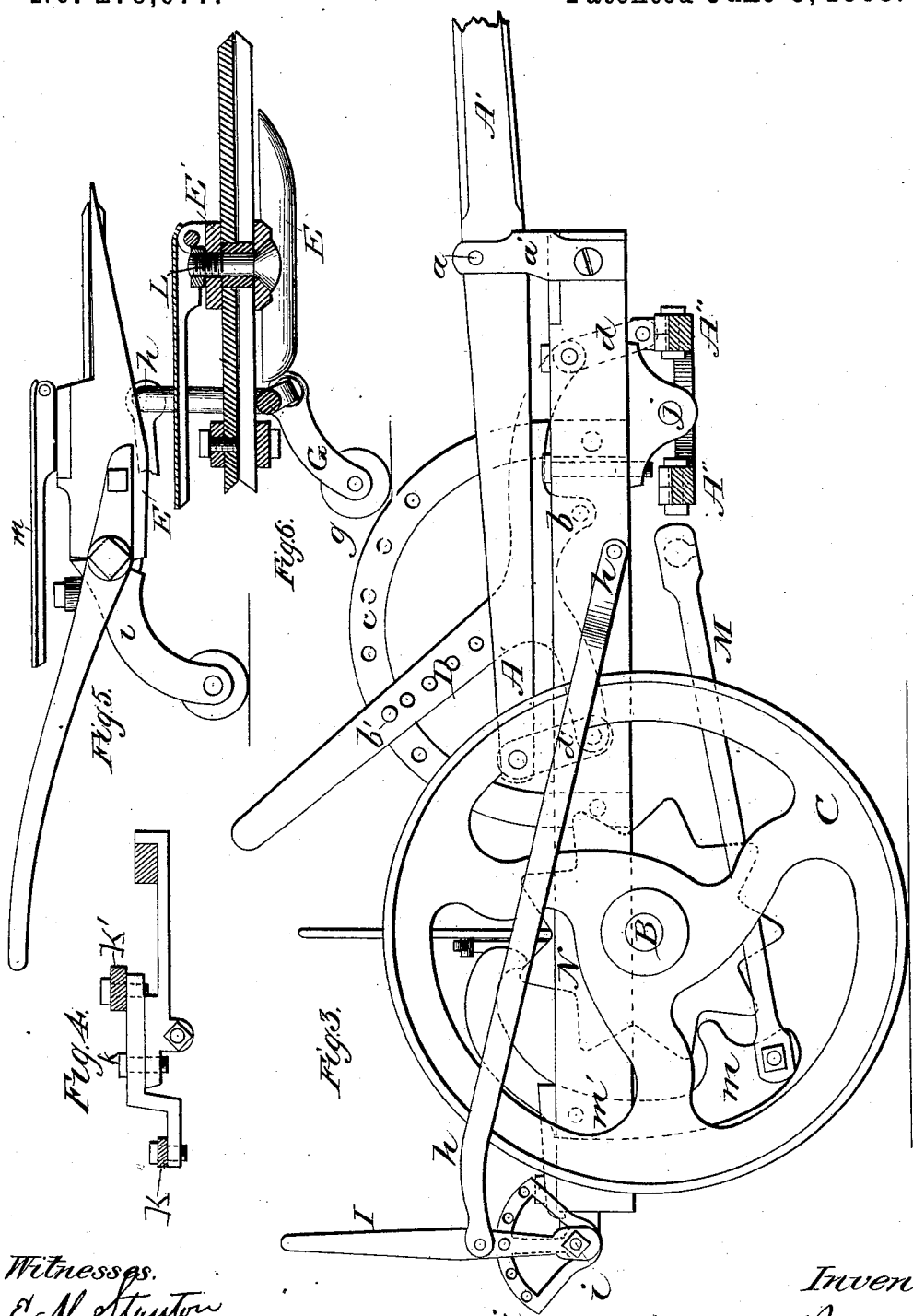

ISAAC BRANCH, OF ADAIRSVILLE, GEORGIA.

MOWING AND REAPING MACHINE.

SPECIFICATION forming part of Letters Patent No. 279,077, dated June 5, 1883.

Application filed October 20, 1882. (Model.)

*To all whom it may concern:*

Be it known that I, ISAAC BRANCH, a citizen of the United States, residing at Adairsville, county of Bartow, in the State of Georgia, have invented a new and valuable Improvement in Mowing and Reaping Machines; and I do hereby declare that the following is a full, clear, and exact description of the construction and operation of the same.

My invention relates to mowing and reaping machines in which the shear-blades are caused to oscillate upon individual pivots by means of a scalloped wheel on the main axle of the machine acting through one or more levers; and it has for its object to render the machine simple in operation, economical in use and in the wear of its parts, and readily adjustable as to the height of its cutter-bar.

To this end the invention consists in the construction and combination of parts hereinafter described and claimed, reference being had to the accompanying drawings, in which—

Figure 1 is a plan view of a mowing-machine embodying my invention, certain portions being represented as broken away to show the parts beneath. Fig. 2 is a detail view of the scalloped wheel and anchor-lever. Fig. 3 is a side elevation, part in section, of a portion of the body of the machine. Fig. 4 is a longitudinal vertical section at *e e*, Fig. 1. Fig. 5 is an elevation at the out end of the cutter-bar. Fig. 6 is a transverse vertical section of the cutter-bar at *f f*, part in elevation.

A represents the frame of the machine.

B is the axle supporting the frame, in bearings of which it revolves, with the wheels C, in which it is made fast.

A' is the team-pole, pivoted to the frame at *a* by means of projecting ears *a'*.

D is a ⊥-shaped lever, pivoted to frame A at *b*, to swing longitudinally at its handle and vertically at its ⊥ ends. The forward arm of lever D is connected by a link, *d*, with the forward arm of a two-armed rock-shaft, A″, which is journaled to the frame in two bearings, *j*.

The cutter-bar E is bifurcated at its inner end, and hung by hinge-bolts to the two arms of rock-shaft A″. The rear arm of lever D is connected by link *d'* with the rear end of the team-pole. The lever D is provided with one or more pin-holes, *b'*, and a pin is placed therein to register with corresponding holes in a circular segment, *c*, when the lever is swung upon its axis. By swinging lever D forward the cutters will be pitched downward, and vice versa. By this means the cutters may be set level, or at any desired pitch, whether they are carried high or low, and they will be held as set by passing the pin through one of the holes *b'* and through a hole in the segment *c*. As a further support to the cutter-bar, I hang a rock-shaft, F, in bearings on the cutter-bar, near its ends. To this shaft I secure two arms, G, bifurcated to serve as carriers for the rollers or wheels *g*, which run on the ground. The inner end of shaft F is provided with an upward-extending crank, H, connected by a rod, *h*, with a hand-lever, I, pivoted to the frame at *i*, and provided with a catch-bolt to engage notches in a fixed arc, *i'*. By carrying the lever I forward both ends of the cutter-bar will be lowered, and vice versa.

J J' are the cutting-blades, each hung, on its own bolt L L', to the cutter-bar E.

E' is a mate to the cutter-bar, to cover the blades and steady the upper ends of the bolts L L', which pass through both bars E E'. The blades are divided into two sets—an upper and a lower set—one set resting on the other. The two sets, provided with cutting-edges on their contiguous faces, are oscillated in opposite directions, to act together as shears. Each blade is provided at its center with a bushing or thimble, *l*, which is a little more than twice as long as the thickness of the blade, and it extends from the inner face thereof, like a hub, and serves as a bearing to the blade, and touches at its ends both bars E E', to prevent the friction which the broader face of the blades would produce if in full contact with the bars. The two ends of the blades are alike, and the upper and lower blades are alike and interchangeable. The adjacent faces of the blades are made a little concave. The rear ends of the two sets of blades J J' are pivoted, respectively, to two driving-bars, K K', to be horizontally oscillated thereby upon their own pivots. These bars K K' are crooked out of line and pivoted at their inner ends to the opposite arms of the T-shaped lever *k*. This lever is pivoted at *k'* to an ear of the cutter-bar E, to be horizontally oscillated by the pitman M, which connects with the anchor-lever *m*, pivoted to the frame at *m'*. The two ends of this lever engage the scalloped wheel N at opposite points of the scallops—that is, when one end of the lever is at the bottom of one scallop the other end will be at the top of another scallop. The scalloped wheel N is mounted on the main shaft B, to revolve therewith, or to stand still and allow the shaft to revolve therein, as the common clutch $o$ is connected or disconnected. The lever $k$ and pitman M are connected by a ball-and-socket joint, or its equivalent, to accommodate the horizontal motion of one and the vertical motion of the other. When the machine advances and the clutch is engaged the revolving shaft B revolves the scalloped wheel N, causing lever $m$ to oscillate, thus reciprocating the shear-blades by means of the pitman M, lever $k$, and rods K K'.

Instead of the scalloped wheel and two-ended lever, a wheel may have a cam-groove in one face shaped like the scalloped edge of wheel N, and the lever $m$ may have a stud carrying a roller to enter said groove, thus dispensing with one of the two bearing ends of lever $m$.

P is a cover for the rear ends of the blades, hinged to the cutter-bar E' at $p$, to prevent the grass or grain from falling in among the blades and clogging them, and to be raised upon its hinges when it is desired to get at the blade-connections. The cover rests, to the rear of its hinges, on the bolts L, to permit the blades to oscillate freely under it.

Having described my invention, what I claim is—

1. The combination, with the frame A, having ears $a'$, and the axle B and wheels C, supporting the rear portion thereof, of the pole A', pivoted in said ears, the inverted-T-shaped lever D, pivoted to the frame, the links $d'$ and $d$, connecting lever D with the pole A' and the rock-shaft A'', respectively, the rock-shaft journaled at $j$ in frame A, and the bifurcated cutter-bar E, hinged to said rock-shaft, as shown and described.

2. The scalloped wheel N, the anchor-lever $m$, the connecting-bar M, the T-shaped lever $k$, and the bent driving-bars K K', in combination with the two sets of shear-blades J J', each blade being independently pivoted to the cutter-bars E E', and the cutter-bar E, having said blades J J' and the T-shaped lever $k$ pivoted thereto, as shown and described.

3. The blades J and J', each having cutting-edges at both ends and both sides, and each adapted to oscillate upon an independent bushing, $l$, in combination with the bars E E', and the bolts L, passing through said bars and bushings, binding the bars against the bushings, and said bushings each extending through its blade and beyond the face thereof to an amount equal to the thickness of the mate blade, substantially as and for the purpose specified.

In testimony that I claim the above I have hereunto subscribed my name in the presence of two witnesses.

ISAAC BRANCH.

Witnesses:
E. M. STANTON,
JNO. SIMMONS.